Figure 1:
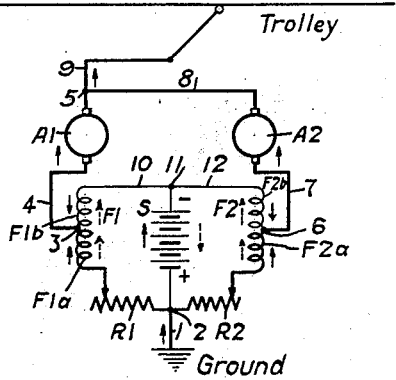

R. E. HELLMUND.
SYSTEM OF CONTROL.
APPLICATION FILED DEC. 29, 1915.

1,327,819.  Patented Jan. 13, 1920.

WITNESSES:

INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,327,819.  Specification of Letters Patent.  Patented Jan. 13, 1920.

Application filed December 29, 1915. Serial No. 69,187.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to systems of control and especially to the regenerative control of a plurality of electric railway motors or the like.

One of the objects of my invention is to provide a relatively simple control system embodying a plurality of parallel-connected direct-current regenerating machines wherein the field currents are inherently and reliably varied oppositely and simultaneously with variations of the corresponding armature currents.

More specifically stated, it is the object of my invention to provide a plurality of momentum-driven dynamo-electric machines having armatures and series-type field-magnet windings so connected as to tend to permit of the transfer of energy, from one to another field winding or to or from a common source of exciting energy for the field windings under predetermined conditions, to simultaneously weaken the field excitation of one of the regenerating machines and strengthen the field excitation of the other, and thus maintain a substantially constant regenerative current in each machine and also a substantially equal distribution of regenerative current between the machines.

According to one aspect of my present invention, I provide a plurality of regenerative parallel-connected armatures and a corresponding number of parallel-related field-magnet windings of the series type, the armatures being connected to intermediate points of the corresponding field-magnet windings. The intermediate points selected may be those that are employed for "field control" purposes during the accelerating period, in accordance with a familiar practice. A single source of energy is provided to excite all the field-magnet windings. During regenerative operation, the action of the system is such that, in case of an incipient increase of current in any armature, the excitation of the corresponding field winding is weakened and the energization of the other field winding is, or may be, strengthened, a transfer of equalizing energy taking place or tending to occur between the field-magnet windings in the one or the other direction or to or from the common source of energy to inherently effect a substantially equal distribution of load current between the armatures and to maintain a substantially constant regenerative current in each armature, as hereinafter more fully set forth.

In the accompanying drawing, Figure 1 is a diagrammatic view of the main circuits of a system of control embodying my invention; Fig. 2 to Fig. 5, inclusive, are similar diagrammatic views of a modification of my system and illustrating various current conditions in the machine circuits during the regenerative period; and Fig. 6 is a diagrammatic view that is inserted by way of explanation.

Referring to Fig. 1, the system shown comprises a plurality of suitable positive and negative supply-circuit conductors respectively marked "Trolley" and "Ground"; a plurality of regenerative dynamo-electric machines respectively having armatures A1 and A2 and series-type field-magnet windings F1 and F2; a source of energy S for exciting the field windings F1 and F2, and a plurality of field-regulating resistors R1 and R2.

The circuits during regenerative operation may be traced as follows: One circuit is established from the supply-circuit conductor Ground which, as will be understood, is the positive conductor during regenerative operation, through conductor 1 to a junction-point 2, where the circuit divides, one branch including the resistor R1, a portion F1a of the field-magnet winding F1 to an intermediate point 3 of the field winding, conductor 4, armature A1 and a junction-point 5. A second branch is completed from the junction-point 2, through the resistor R2, a section F2a of the field-magnet winding F2 to an intermediate point 6, conductor 7, armature A2 and conductor 8 to the junction-point 5, whence circuit is completed through conductor 9 to the other supply-circuit conductor Trolley.

A further circuit is established from the positive terminal of the auxiliary source of energy S, which is here shown as a storage battery, through the junction-point 2, the resistor R1, both the sections F1a and F1b of the field-magnet winding F1, and conductor 10 to a junction-point 11 that is connected to the negative terminal of the auxiliary source of energy. A similar parallel-related circuit is completed from the junction-point 2, through the resistor R2, both the sections F2a and F2b of the field-magnet winding F2 and conductor 12 to the junction-point 11. The regenerating armatures A1 and A2 are thus disposed in parallel-circuit relation and are respectively connected to the intermediate points 3 and 6 of the corresponding field-magnet windings F1 and F2. The points 3 and 6 may conveniently be those that are employed for "field control" purposes during the accelerating period, whereby, as illustrated in Fig. 6, for example, the sections F1b and F2b may be excluded from circuit after the motors have attained full-series or full-parallel relation or both, as is common practice. However, it will be understood that any other intermediate point may be selected, if desired. The source of energy S is connected to energize both of the field-magnet windings F1 and F2 through the respective variable resistors R1 and R2.

The courses taken by the main regenerative currents, under predetermined conditions, as more fully set forth later, are indicated by the solid arrows, while the direction of energization of the field-magnet windings by the source of energy S is indicated by dotted arrows. It may, therefore, be stated that the armatures A1 and A2 are connected in series relation with the field-winding sections F1a and F2a, respectively, while the remaining field-winding sections F1b and F2b are respectively connected in parallel-circuit relation with the first-mentioned field-winding sections F1a and F2a. Furthermore, the complete field windings F1 and F2 are each connected in series relation with the source of energy S.

The relation of field-strengths or ampere-turns of the sections of each main field winding under all operative conditions during regeneration is such that the sections F1a and F2a predominate, or, in other words, the resultant energization of the field windings is always in the same direction as that of the regenerated current traversing the sections F1a and F2a.

Assuming that the machines are connected to the supply circuit, as illustrated, the regulation of the regenerative operation during the retarding period may be briefly set forth as follows: The full values of the resistors R1 and R2 are initially included in circuit, inasmuch as a relatively weak field excitation is required when the machine speeds are relatively high, as will be understood. To gradually increase the field excitation as the machine speeds decrease, the resistors R1 and R2 may be gradually short-circuited in any suitable manner to thus correspondingly increase the effective field excitation.

The inherent and relatively rapid regulation of the field excitation, whereby a substantially constant regenerated current is maintained in each armature and whereby also a substantially equal distribution of load current between the two armatures is effected and maintained, may be best set forth by reference to Fig. 2 to Fig. 5, inclusive, wherein a number of typical cases have been chosen and numerically marked with respect to the currents that traverse the various portions of the control system under predetermined conditions.

In general, in the event of an incipient increase, for example, in the current traversing one of the armatures, by reason of variations in the air gaps of the several motors or because of differences in corresponding wheel diameters of the vehicle trucks, the field excitation of the machine taking increased current is suitably weakened by the inherent and immediate opposition of currents that traverse the two sections of the field-magnet winding in question. On the other hand, conditions may be such that it is desirable to simultaneously increase the excitation of the other field-magnet winding and thus correspondingly augment the voltage of the second armature, while the voltage of the first armature is being reduced. Dependent upon the portion of the regenerative period, or, in other words, dependent upon the value of current that traverses those sections of the field-magnet windings that are in direct-series relation with the regenerating armatures, a transfer of equalizing energy, from one to the other field-magnet winding in either direction or to or from the common source of exciting energy, may be required.

The systems that are shown in Fig. 2 to Fig. 5, inclusive, differ from the system that is illustrated in Fig. 1 only in the substitution of an auxiliary source of energy S1 for the auxiliary source S. The source S1 is illustrated as comprising a dynamo-electric machine armature winding which may conveniently be the generator armature winding of a motor-generator set or dynamotor. The armature winding of the source S1 may be associated with a motor armature winding (not shown) in any suitable manner, as by a shaft 13, the motor being driven from the supply circuit or from any other suitable source. In the system that is illustrated in Fig. 1, the battery will either discharge or will be charged in accordance with the direction of the current flow therethrough, while in the remaining systems, the direction of the flow of current through the auxiliary source S1 will determine whether the armature winding temporarily acts as a motor or as a generator winding, as will be understood.

Figure 4:
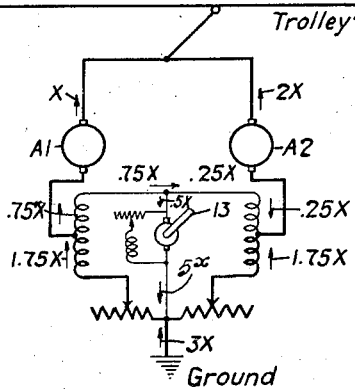

In case a motor-generator set, or a dynamotor of the variable-voltage type that is set forth in my co-pending application Serial No. 66,725, filed Dec. 14, 1915, is employed, the resistors R1 and R2 may be omitted, and main field regulation may be effected by the use of any suitable variable field excitation of the auxiliary machine, as indicated in Fig. 4.

Figure 2:
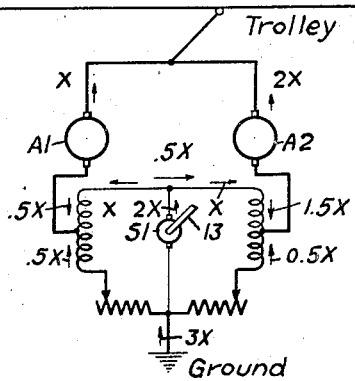

To cite more specific example, the regenerative conditions that are illustrated in Fig. 2 may be first assumed, wherein the total regenerative current is assumed to have a value of 3X, which is divided in the unbalanced proportion of X amperes in the armature A1 and 2X amperes in the armature A2 for an instant. Furthermore, for the sake of simplicity, the resistance of the field-winding sections has been assumed as negligible. During the high-speed or initial portion of the regenerative period, the currents in the field-winding portions that are series-connected with respect to the armatures is relatively low, as explained above, and is here assumed as equal to 0.5X in each of the field-winding sections F1a and F2a. A current of 2X amperes will then traverse the source of energy S1, in the reverse or motoring direction, from the conductor Ground, as indicated by the arrows; and component currents of X amperes may be assumed to traverse each of the conductors 10 and 12 from the source of energy. However, a certain transfer of equalizing energy also tends to occur at this time, whereby a current equal to 0.5X amperes may be considered to traverse the field-winding section F1b in a direction that is opposite to the direction of current in the field-winding section F1a, while a current of 1.5X amperes may be assumed to traverse the field-winding section F2b in the opposite direction to the main current that flows through the field-winding section F2a. Under such conditions, the excitation of the field-magnet winding F2 is immediately and inherently reduced to a predetermined value, while the effective excitation of the other field-magnet winding F1 is increased, to a certain extent, thereby effecting the desired conditions of equal distribution of load between the regenerating armatures and the maintenance of a substantially constant current in each armature.

Figure 3:
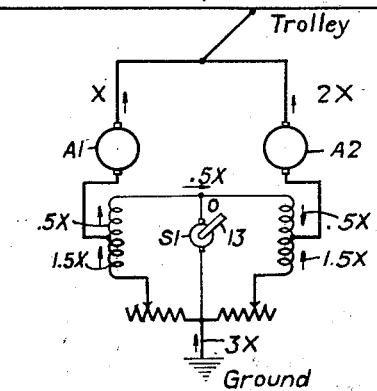

Referring to Fig. 3, which represents conditions when the machine speeds have decreased a certain amount, and a current of 1.5X traverses the series-connected field-winding portions F1a and F2a, the relation of currents is such that the source of energy S1 carries a current of zero value, or, in other words, is temporarily inoperative. As indicated by the arrows, the currents in the other field-winding sections F1b and F2b, each equal 0.5X amperes, and the currents in the two portions of the field winding F1 are in the same direction, while the currents traversing the two portions of the field winding F2 are in opposite directions. In this case, an equalizing current of 0.5X amperes in value may be considered to flow from the field-winding section F1b to the section F2b, and the substantially constant conditions desired are rapidly and inherently restored.

In this connection, it may be observed that, in the type of regenerative control systems wherein an auxiliary source of energy for the field windings is not required, as set forth in my co-pending application Serial No. 71,198, filed Jan. 10, 1916, a suitable transfer of energy from the one to the other field-magnet winding in either direction will occur to produce the balancing effect required, in a similar manner; that is to say, inherently and immediately, but without, of course, employing any auxiliary source of energy.

In the system that is shown in Fig. 4, the machine speeds are assumed as still further decreased, and a current of 1.75X amperes is assumed as flowing in the field-winding sections F1a and F2a. Under such conditions, a current of 0.75X flows through the field-winding section F1b in the assisting direction, while a current of 0.25X amperes traverses the field-winding portion F2b in the opposing direction.

The auxiliary source of energy S1 in the present case supplies a current of 0.5X amperes to the field windings, while an equalizing current of 0.25X amperes flows from one field winding to the other to effect the desired restoration of current conditions.

Figure 5:
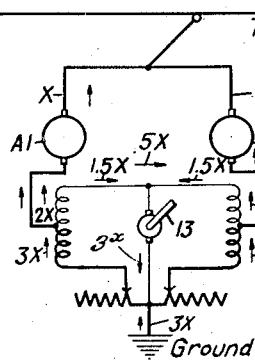
Figure 6:
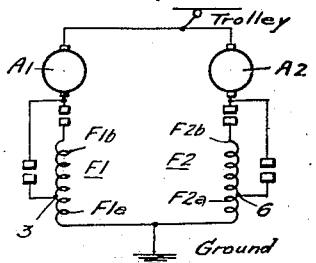

In Fig. 5, the last portion of the regenerative period is illustrated wherein a current of 3X amperes, equaling the total regenerative current, is required in each of the series-connected field-winding sections F1a and F2a. Under these circumstances, the auxiliary source S1 also supplies a current of 3X amperes, with the result that currents equal in value to 2X amperes and X amperes, respectively, flow through the field-winding sections F1b and F2b, in the assisting direction in each case. Currents of 1.5X amperes are assumed to traverse the conductors 10 and 12 in opposite directions to combine and constitute the 3X amperes that the auxiliary source S1 supplies, while the remaining field-winding current of the sections F1b and F2b is considered to take the form of an equalizing current of 0.5X amperes in the direction toward the field-winding section F2b.

It will be understood that, under all other regenerative conditions, wherein the currents traversing the series-connected field-winding sections F1a and F2a differ from the values designated in the various figures by predetermined amounts, the resultant currents in the auxiliary source of energy S1 and the field-winding sections F1b and F2b automatically assume such values that the desired substantially constant regenerative conditions are inherently maintained.

I do not wish to be restricted to the specific circuit connections or arrangement and location of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit, of a plurality of dynamo-electric machines severally having armatures and field-magnet windings, means for connecting said armatures to intermediate points of the respective field windings and for connecting a plurality of sets of corresponding points in said field windings.

2. In a system of regenerative control, the combination with a supply circuit, of a plurality of dyanmo-electric machines severally having armatures and field-magnet windings, means for connecting said armatures to intermediate points of the corresponding field windings, and means for interconnecting said field windings, whereby, under predetermined regenerative conditions, certain portions of the field windings are employed for excitation only and the remaining portions are utilized to transfer equalizing energy in the one or the other direction to maintain substantially constant regenerated currents in said armatures.

3. In a system of control, the combination with a supply-circuit, of a plurality of dynamo-electric machines severally having armatures and field-magnet windings, means for connecting said armatures to intermediate points of the respective field windings, means for interconnecting the corresponding field-winding terminals, means for connecting said armatures to the positive supply-circuit conductor, and means for connecting the lower field-winding terminals to the negative supply-circuit conductor.

4. In a system of control, the combination with a dynamo-electric machine having an armature and a field-magnet winding, of a source of energy for supplying to a portion of said field winding the difference between the currents traversing the armature and the other portion of said field winding, and means for connecting said armature and field winding whereby a variation of armature current inherently effects an opposite variation of effective field-winding excitation.

5. In a system of control, the combination with a dynamo-electric machine having an armature and a field-magnet winding, of a source of energy for supplying to a portion of said field winding the difference between the currents traversing the armature and the other portion of said field winding, means for inherently varying the field strength oppositely to variations of armature current, and means for gradually varying the field-winding current.

6. In a system of control, the combination with a dynamo-electric machine having an armature and a field-magnet winding, of a source of energy adapted to send a current through said field winding in a predetermined direction, and means for connecting said armature and field winding whereby the armature current respectively assists and opposes the current from said source in different portions of said field winding under predetermined conditions to cause the resultant main field strength to vary in accordance with the load current.

7. In a system of control, the combination with a dynamo-electric machine having an armature and a field-magnet winding, of a source of energy adapted to send a current through said field winding in a predetermined direction, and means for connecting said armature to an intermediate point of said field winding, whereby the armature current traverses the portions of the field winding in opposite directions under predetermined conditions to cause the resultant main field strength to vary in accordance with the load current.

8. In a control system, the combination with a supply circuit, of an auxiliary source of energy, and a dynamo-electric machine having an armature, a field-winding section connected in series-circuit relation therewith, and a second field-winding section connected in series-circuit relation with said auxiliary source, said second field winding section being connected in series relation with said first field-winding section with respect to said auxiliary source.

9. In a regenerative-control system, the combination with a supply circuit, of an auxiliary source of energy, and a momentum-driven dynamo-electric machine having an armature, a series-type field-winding section connected in series-circuit relation therewith across said supply circuit, and a second series-type field-winding section connected in series-circuit relation with said auxiliary source, said second field-winding section being connected in series relation with said first field-winding section with respect to said auxiliary source.

10. In a system of control, the combination with a supply circuit, of a plurality of dynamo-electric machines severally having armatures and field-magnet windings, a common source of energy connected across said field windings, and means for connecting said armatures and field windings to permit of a transfer of energy from the one to the other field winding or to or from said common source under predetermined conditions to simultaneously weaken the excitation of the first field winding and strengthen the excitation of the other.

11. In a system of regenerative control, the combination with a supply circuit, of a plurality of dynamo-electric machines severally having armatures and field-magnet windings, a common source of energy connected across said field windings, and means for connecting said armatures and field windings to permit of a transfer of energy from the one to the other field winding or to or from said common source under predetermined conditions to oppositely vary the excitations of the field windings simultaneously, whereby a substantially constant regenerated current is supplied by said armatures throughout regenerative operation.

12. In a system of control, the combination with a supply circuit, of a plurality of dynamo-electric machines severally having armatures and field-magnet windings, a source of energy connected across said field windings, and means for connecting said armatures to intermediate points of the respective field windings.

13. In a system of control, the combination with a supply circuit, of a plurality of dynamo-electric machines severally having armatures and field-magnet windings, a source of energy connected across said field windings, means for connecting said armatures to intermediate points of the respective field windings, means for interconnecting the corresponding field-winding terminals, means for connecting said armatures to the positive supply-circuit conductor, and means for connecting the lower-field-winding terminals to the negative supply-circuit conductor.

14. In a system of control, the combination with a supply circuit, of a plurality of dynamo-electric machines severally having armatures and field-magnet windings, a source of energy connected to said field windings, and means for connecting said armatures and field windings in such manner that certain portions of the field windings carry predetermined exciting currents while other portions thereof carry equalizing currents flowing from the one to the other machine circuit to cause the resultant main field strength to vary in accordance with the load current.

15. In a system of control, the combination with a supply circuit, of a plurality of dynamo-electric machines severally having armatures and multi-section field-magnet windings, a source of energy connected to send current through the field-magnet windings in one direction, and means for connecting said armatures and field windings in such manner that certain sections of the field windings carry predetermined exciting currents, while the remaining sections carry currents equal to the differences of said exciting currents and the corresponding armature currents to cause the resultant main-field strength to vary in accordance with the load current.

16. In a system of control, the combination with a supply circuit, of a plurality of dynamo-electric machines severally having armatures and field-magnet windings, a substantially constant-voltage source of energy for said field windings, and means for connecting said armatures to said field windings to simultaneously effect, upon an incipient increase of current in one armature, a simultaneous decrease of the corresponding field-winding strength and increase of the other field-winding strength.

17. In a system of control, the combination with a supply circuit, of a plurality of dynamo-electric machines severally having armatures and field-magnet windings, a source of energy connected across said field windings, and means for connecting said armatures and field windings to inherently effect a balancing of machine loads with all circuit connections unchanged.

In testimony whereof, I have hereunto subscribed my name this 15th day of Dec., 1915.

RUDOLF E. HELLMUND